United States Patent
Yi et al.

(10) Patent No.: US 10,868,658 B2
(45) Date of Patent: Dec. 15, 2020

(54) METHOD AND APPARATUS FOR HANDLING VARIOUS IOT NETWORK ACCESS IN WIRELESS COMMUNICATION SYSTEM

(71) Applicant: LG ELECTRONICS INC., Seoul (KR)

(72) Inventors: Yunjung Yi, Seoul (KR); Bonghoe Kim, Seoul (KR); Kijun Kim, Seoul (KR); Byounghoon Kim, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 15/759,612

(22) PCT Filed: Sep. 26, 2016

(86) PCT No.: PCT/KR2016/010755
§ 371 (c)(1),
(2) Date: Mar. 13, 2018

(87) PCT Pub. No.: WO2017/052326
PCT Pub. Date: Mar. 30, 2017

(65) Prior Publication Data
US 2019/0044690 A1    Feb. 7, 2019

Related U.S. Application Data

(60) Provisional application No. 62/232,422, filed on Sep. 24, 2015, provisional application No. 62/236,136, (Continued)

(51) Int. Cl.
*H04L 5/14* (2006.01)
*H04W 72/04* (2009.01)
(Continued)

(52) U.S. Cl.
CPC .............. *H04L 5/14* (2013.01); *H04L 5/0053* (2013.01); *H04L 12/189* (2013.01);
(Continued)

(58) Field of Classification Search
None
See application file for complete search history.

(56) References Cited

U.S. PATENT DOCUMENTS

| 8,743,785 | B2 | 6/2014 | Qu et al. |
| 2011/0176461 | A1 | 7/2011 | Astely et al. |

(Continued)

FOREIGN PATENT DOCUMENTS

| WO | 2014/042373 A1 | 3/2014 |
| WO | 2014/112850 A1 | 7/2014 |

OTHER PUBLICATIONS

Samsung. "TDD configuration adaptation for Low Cost UEs". 3GPP TSG RAN WG1 #82. R1-154109. Beijing, China, Aug. 24-28, 2015.

*Primary Examiner* — Donald L Mills
(74) *Attorney, Agent, or Firm* — Birch, Stewart, Kolasch & Birch, LLP

(57) ABSTRACT

A method and apparatus for transmitting information in a wireless communication system is provided. A base station (BS) determines downlink (DL) subframes according to a number of supported time division duplex (TDD) configurations, and transmits at least one of synchronization signals or a physical broadcast channel (PBCH) to an internet-of-things (IoT) user equipment (UE) via the DL subframes.

19 Claims, 11 Drawing Sheets

Related U.S. Application Data filed on Oct. 2, 2015, provisional application No. 62/250,549, filed on Nov. 4, 2015.

(51) Int. Cl.
    *H04L 5/00*       (2006.01)
    *H04L 12/18*     (2006.01)
    *H04W 4/70*     (2018.01)

(52) U.S. Cl.
    CPC ..... *H04W 72/042* (2013.01); *H04W 72/0446* (2013.01); *H04L 5/1469* (2013.01); *H04W 4/70* (2018.02)

(56) References Cited

U.S. PATENT DOCUMENTS

| | | | | |
|---|---|---|---|---|
| 2013/0044651 A1* | 2/2013 | Wang | | H04W 72/0406 370/280 |
| 2013/0044652 A1* | 2/2013 | Wang | | H04L 1/08 370/280 |
| 2013/0083710 A1* | 4/2013 | Chen | | H04W 72/042 370/281 |
| 2015/0124663 A1* | 5/2015 | Chen | | H04L 5/0053 370/278 |
| 2016/0165578 A1* | 6/2016 | Chen | | H04L 5/0037 370/280 |
| 2016/0254948 A1* | 9/2016 | Chen | | H04W 72/0446 370/254 |
| 2016/0309282 A1* | 10/2016 | Xu | | H04W 24/08 |
| 2016/0345332 A1* | 11/2016 | Cheng | | H04L 5/001 |
| 2017/0019911 A1* | 1/2017 | Rico Alvarino | | H04B 3/36 |
| 2017/0048821 A1* | 2/2017 | Xu | | H04W 48/12 |
| 2017/0331611 A1* | 11/2017 | Stern-Berkowitz | | H04W 72/1289 |
| 2017/0359161 A1* | 12/2017 | Montojo | | H04L 5/14 |
| 2019/0239241 A1* | 8/2019 | Rico Alvarino | | H04B 3/36 |

* cited by examiner

[Fig. 1]
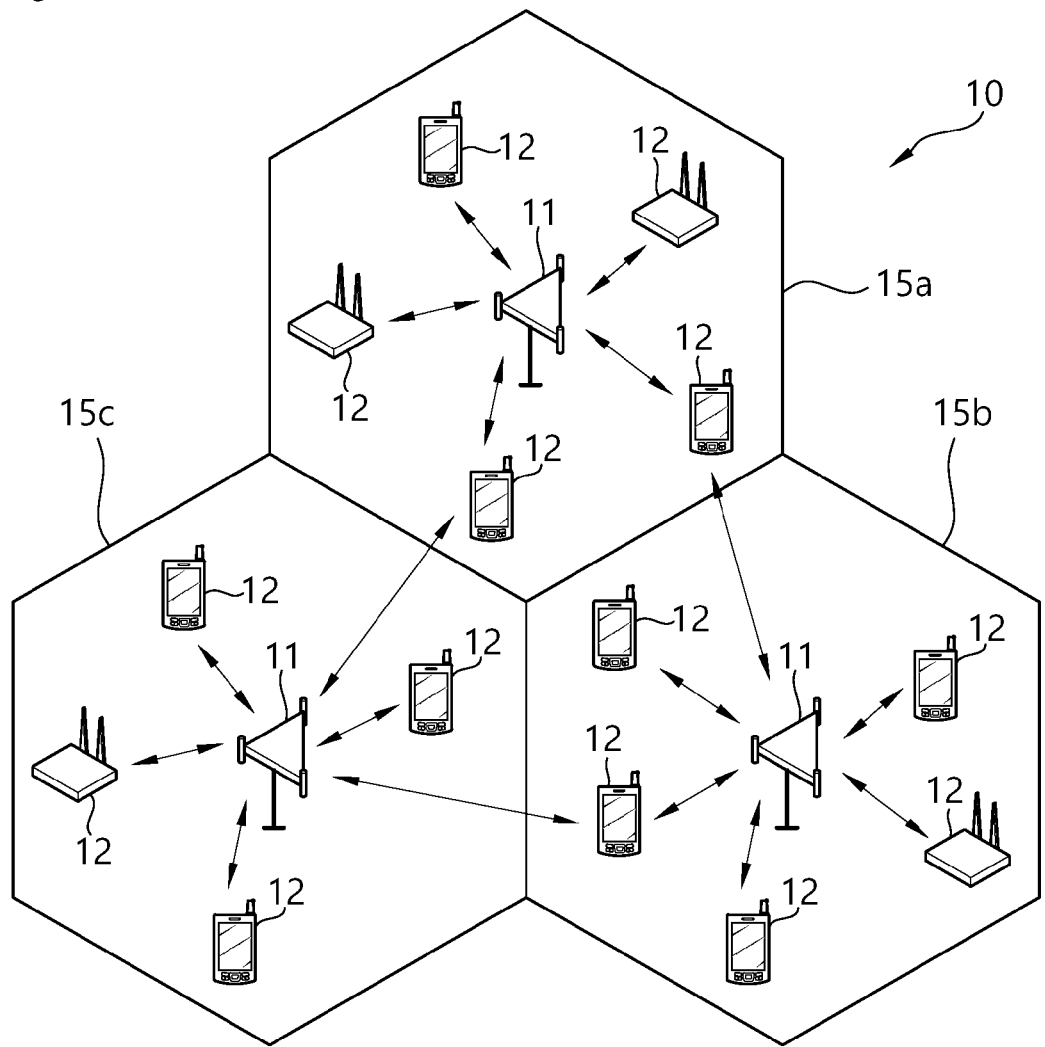
[Fig. 2]
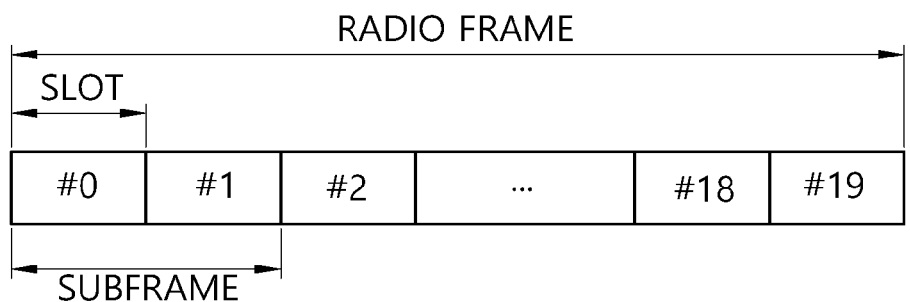

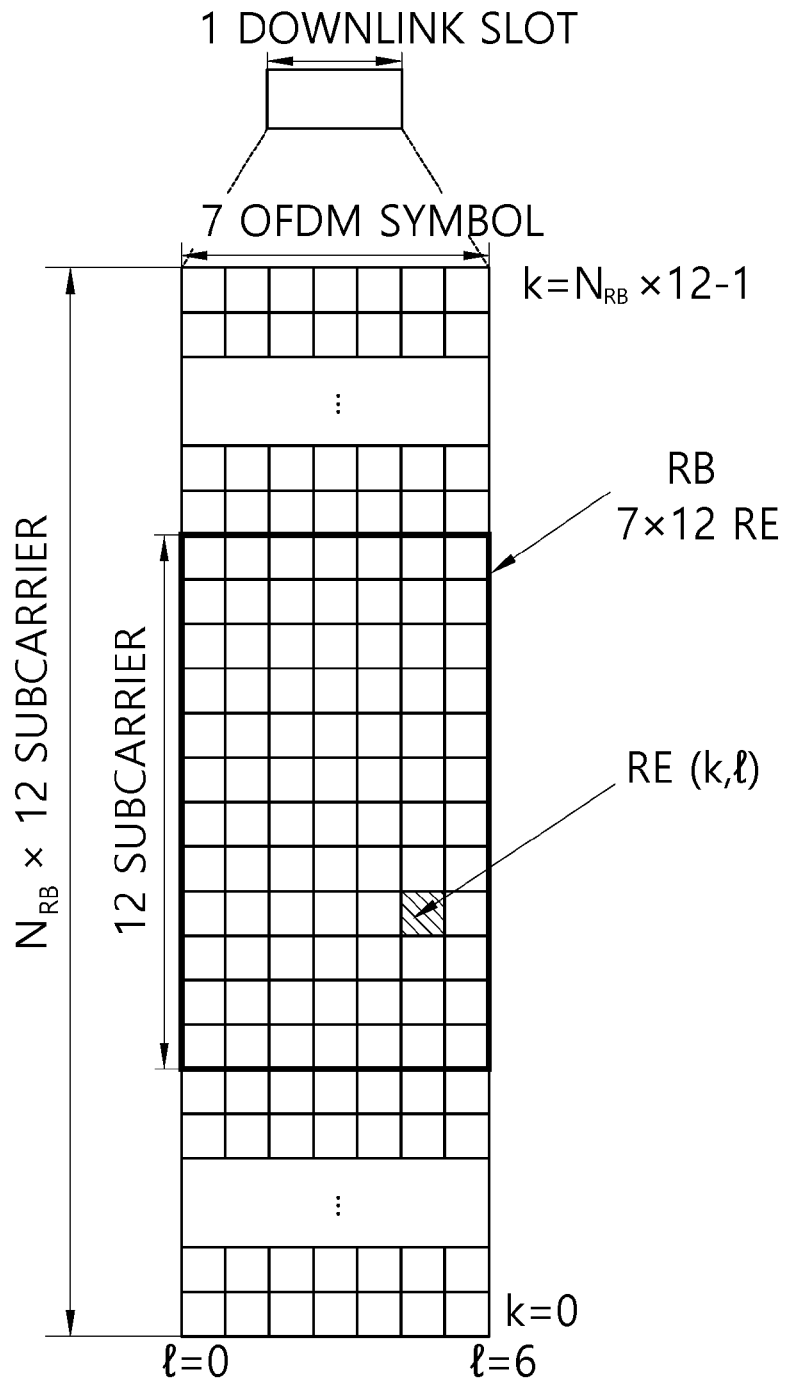
[Fig. 3]

[Fig. 4]
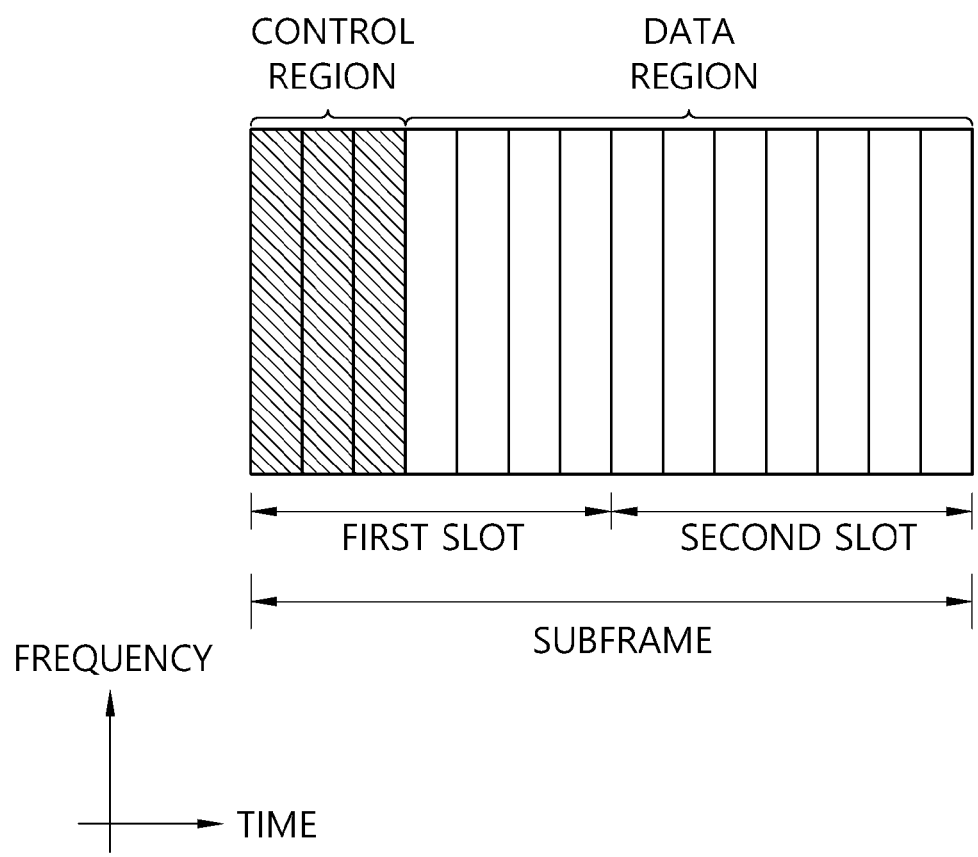

[Fig. 5]
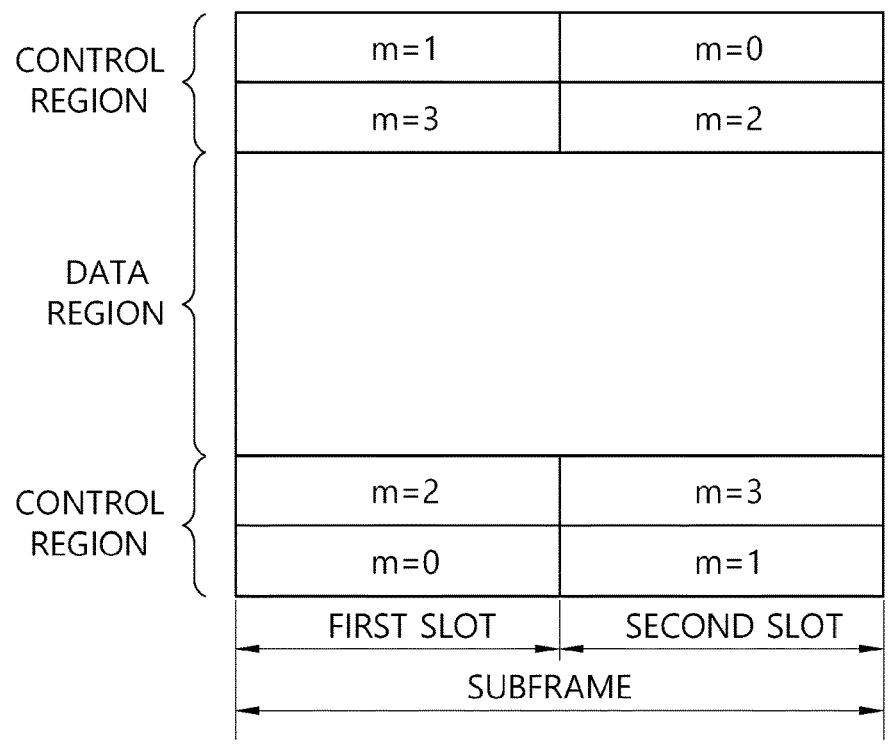
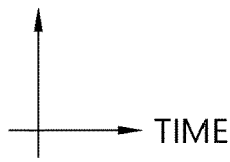
[Fig. 6]
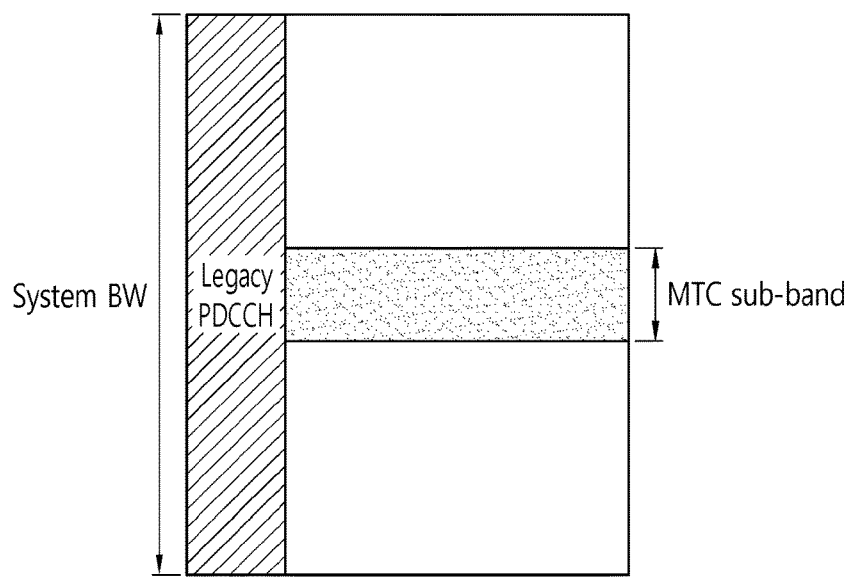

[Fig. 7]
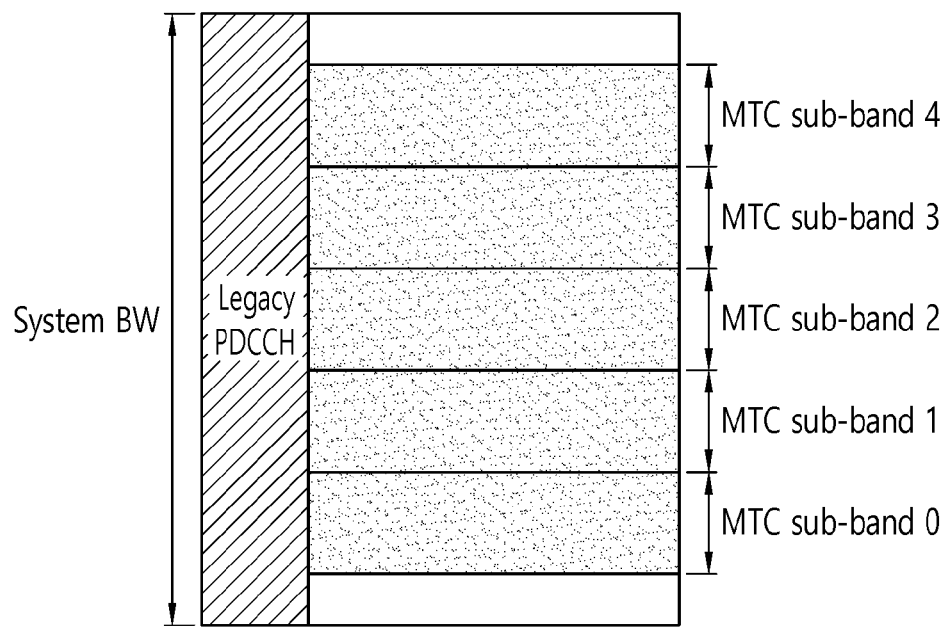

[Fig. 8]
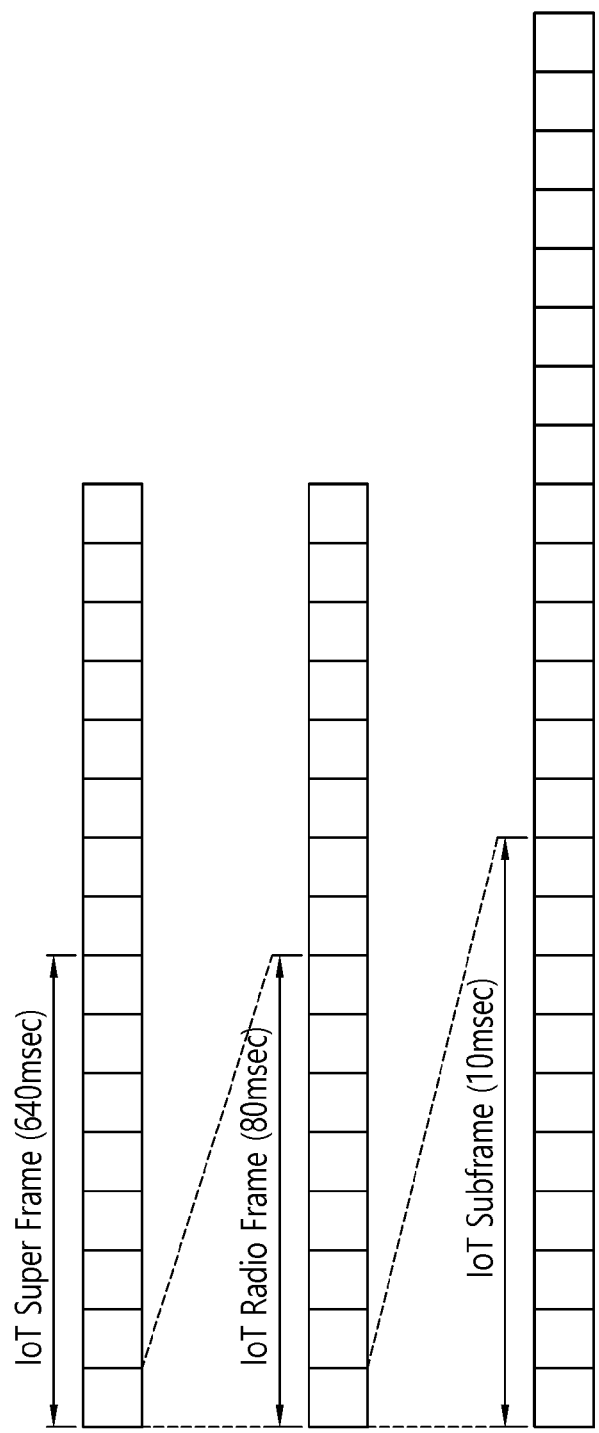

[Fig. 9]
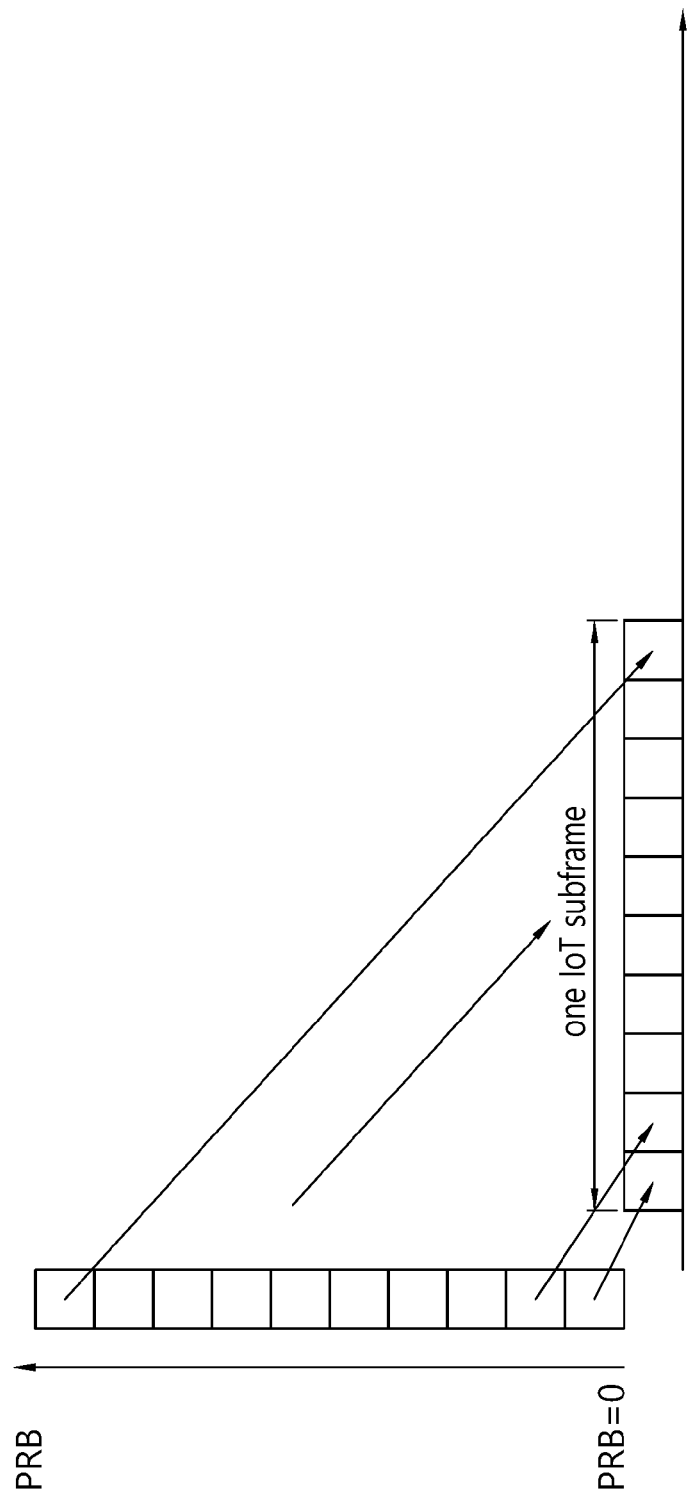

[Fig. 10]
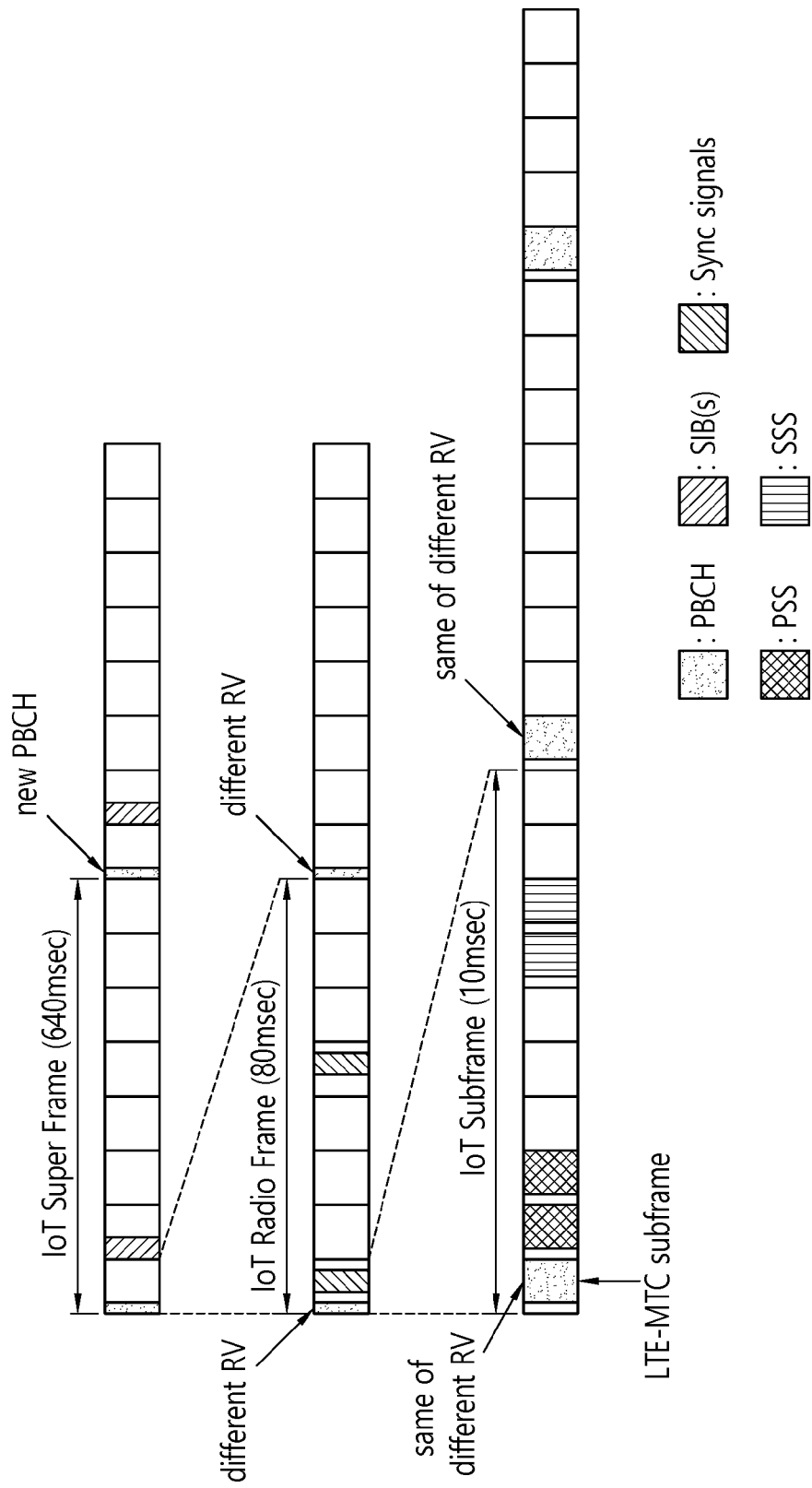

[Fig. 11]
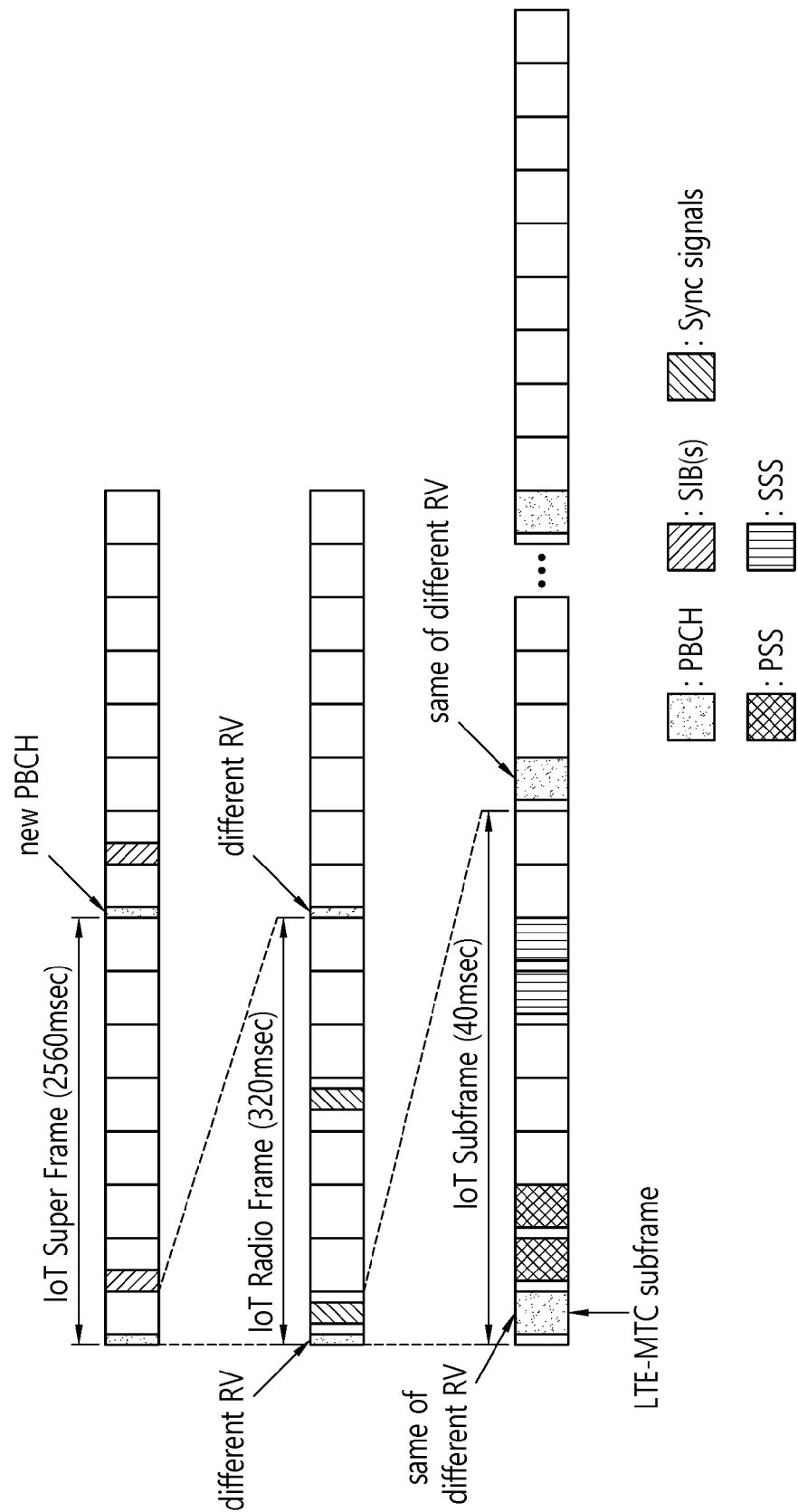

[Fig. 12]
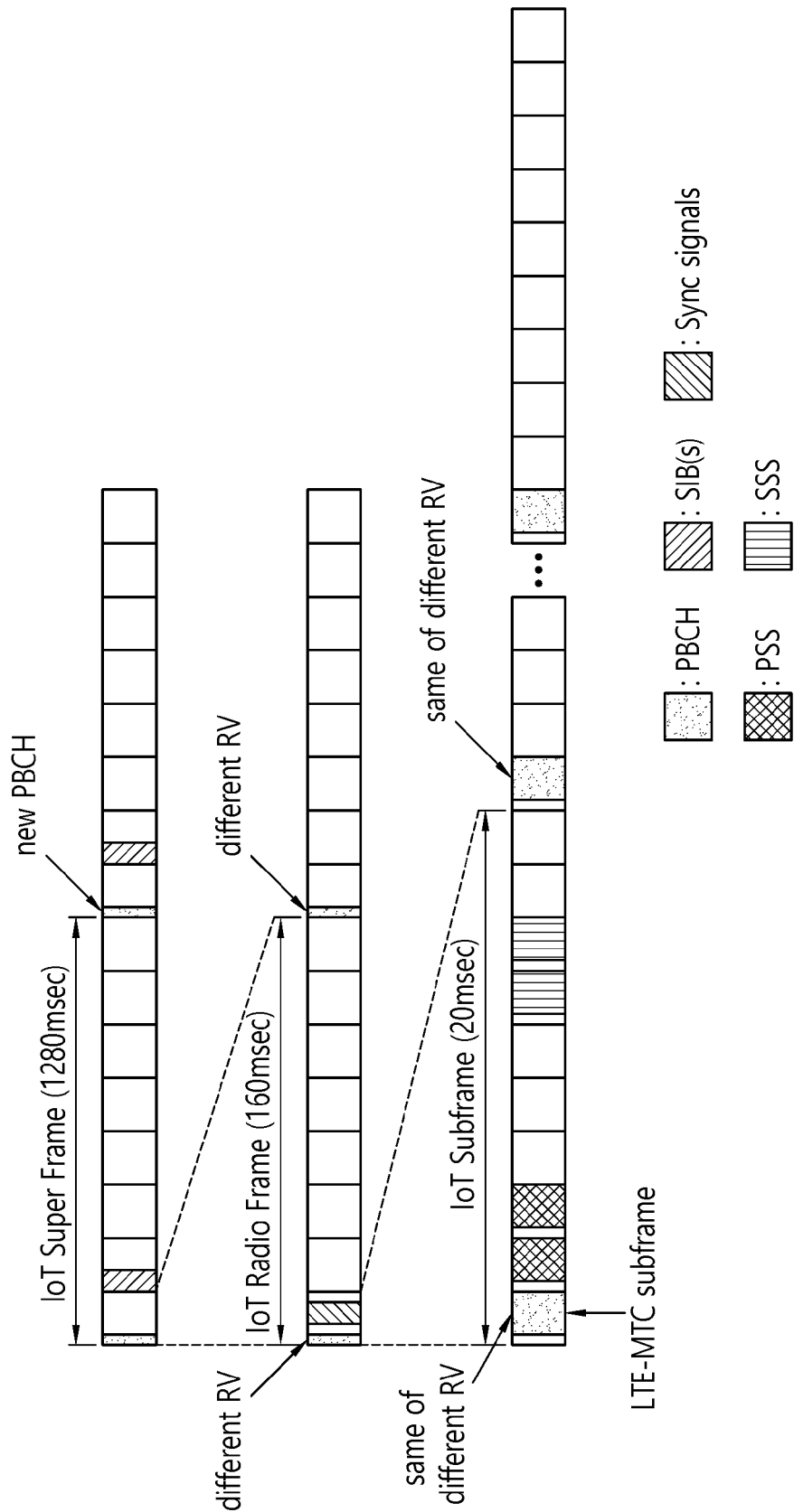

[Fig. 13]
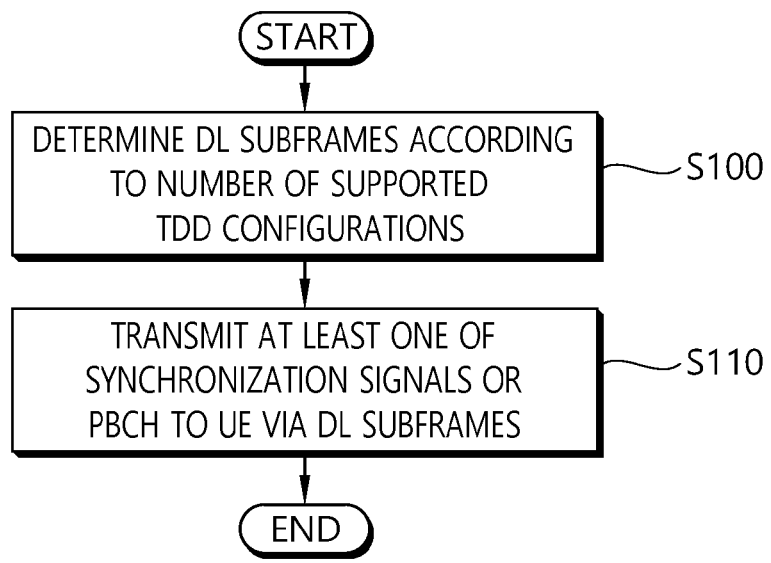
[Fig. 14]
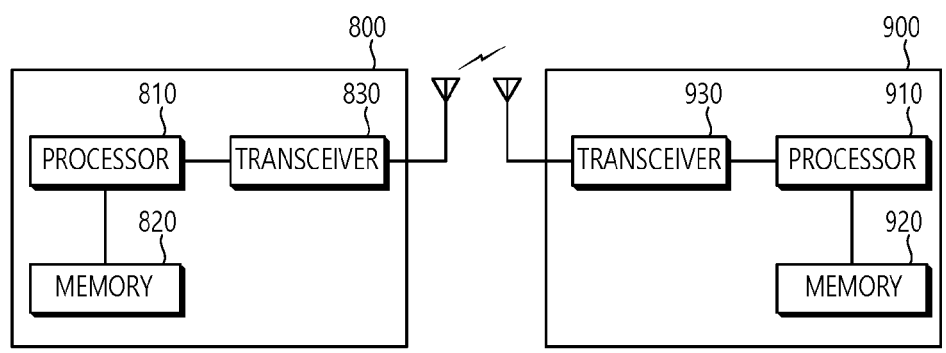

METHOD AND APPARATUS FOR HANDLING VARIOUS IOT NETWORK ACCESS IN WIRELESS COMMUNICATION SYSTEM

CROSS REFERENCE TO RELATED APPLICATIONS

This application is the National Phase of PCT International Application No. PCT/KR2016/010755, filed on Sep. 26, 2016, which claims priority under 35 U.S.C. 119(e) to U.S. Provisional Application No. 62/232,422, filed on Sep. 24, 2015, 62/236,136, filed on Oct. 2, 2015 and 62/250,549, filed Nov. 4, 2015, all of which are hereby expressly incorporated by reference into the present application.

TECHNICAL FIELD

The present invention relates to wireless communications, and more particularly, to a method and apparatus for handling various internet-of-things (IoT) network access in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility.

DISCLOSURE OF INVENTION

Technical Problem

The present invention provides a method and apparatus for handling various internet-of-things (IoT) network access in a wireless communication system. The present invention discusses mechanisms to transmit system information for cellular IoT system.

Solution to Problem

In an aspect, a method for transmitting information by a base station (BS) in a wireless communication system is provided. The method includes determining downlink (DL) subframes according to a number of supported time division duplex (TDD) configurations, and transmitting at least one of synchronization signals or a physical broadcast channel (PBCH) to an internet-of-things (IoT) user equipment (UE) via the DL subframes.

In another aspect, a base station (BS) in a wireless communication system is provided. The BS includes a memory, a transceiver, and a processor, coupled to the memory and the transceiver, that determines downlink (DL) subframes according to a number of supported time division duplex (TDD) configurations, and controls the transceiver to transmit at least one of synchronization signals or a physical broadcast channel (PBCH) to an internet-of-things (IoT) user equipment (UE) via the DL subframes.

Advantageous Effects of Invention

Various IoT network access can be handled efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 and FIG. 7 show an example of subbands in which a MTC UE operates.
FIG. 8 shows an example of IoT frame structure according to an embodiment of the present invention.
FIG. 9 shows an example of subframe index according to an embodiment of the present invention.
FIG. 10 shows an example of synchronization signal and PBCH/SIB transmission according to an embodiment of the present invention.
FIG. 11 shows another example of synchronization signal and PBCH/SIB transmission according to an embodiment of the present invention.
FIG. 12 shows another example of synchronization signal and PBCH/SIB transmission according to an embodiment of the present invention.
FIG. 13 shows a method for transmitting information according to an embodiment of the present invention.
FIG. 14 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

For TDD frame structure, each radio frame of length 10 ms consists of two half-frames of length 5 ms each. Each half-frame consists of five subframes of length 1 ms. Each subframe i is defined as two slots, 2i and 2i+1, of length 0.5 ms each.

The UL-DL configuration in a cell may vary between frames and controls in which subframes UL or DL transmissions may take place in the current frame. The supported UL-DL configurations are listed in Table 1 below.

TABLE 1

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes a DL subframe reserved for DL transmissions, "U" denotes an UL subframe reserved for UL transmissions and "S" denotes a special subframe with the three fields downlink pilot time slot (DwPTS), guard period (GP) and uplink pilot time slot (UpPTS). UL-DL configurations with both 5 ms and 10 ms DL-to-UL switch-point periodicity are supported. In case of 5 ms DL-to-UL switch-point periodicity, the special subframe exists in both half-frames. In case of 10 ms DL-to-UL switch-point periodicity, the special subframe exists in the first half-frame only. Subframes 0 and 5 and DwPTS are always reserved for DL transmission. UpPTS and the subframe immediately following the special subframe are always reserved for UL transmission.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number NAL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

For example, a MTC UE may operate in reduced UE downlink and/or uplink bandwidth of 1.4 MHz (i.e. 6 PRBs), regardless of operating system bandwidth of a cell. In this case, the MTC UE may not receive legacy PDCCH transmitted via whole system bandwidth. Further, it may not be desirable that a PDCCH for the MTC UE is received in OFDM symbols in which the legacy PDCCH is received due to multiplexing issues with PDCCH transmitted to another UE. Accordingly, a new physical DL control channel transmitted in a subband in which the MTC UE operates may be introduced for the MTC UE. The new physical DL control channel for the MTC UE (or, low-complexity UE) may be an existing enhanced PDCCH (EPDCCH) or may be a modified version of PDCCH/EPDCCH. Hereinafter, the new physical DL control channel may be referred to as an M-PDCCH (MTC-PDCCH).

FIG. 6 and FIG. 7 show an example of subbands in which a MTC UE operates. Referring to FIG. 6, a subband in which a MTC UE operates (i.e. MTC subband) is located in a center of the system bandwidth (e.g. center 6 PRBs). Referring to FIG. 7, multiple subbands in which multiples MTC UEs operates are allocated in one subframe for multiplexing of the multiple MTC UEs. In this case, the multiple UEs may use different subbands from each other, or, may use the same subband (not center 6 PRBs).

Further, a MTC UE may operate in further reduced UE downlink and/or uplink bandwidth of 200 kHz (i.e. 1 PRB). The MTC UE may operate in a legacy cell which has a system bandwidth wider than 200 kHz with backward compatibility. This system may be referred to as in-band narrow-band (NB) LTE. Alternatively, the MTC UE may operate in a frequency, in which the legacy cell does not exist and only for the MTC UE. This system may be referred to as stand-alone LTE.

Hereinafter, the present invention discusses how different internet-of-thins (IoT) UEs supporting different bandwidths and/or different operation modes can be effectively supported by the network. For the convenience, the present invention may focus on three different IoT UEs as follows.

(1) Category 1 (or 0) UE (hereinafter, Cat 1 UE) supporting coverage enhancements: This UE may support wideband, such as 20 MHz.

(2) Category 0-M UE (hereinafter, Cat 0-M UE) supporting narrowband, such as 1.4 MHz, and optionally supporting coverage enhancements: This UE category may be called as Category 0 as well.

(3) Category M UE (hereinafter, Cat M UE) supporting narrowband, such as 200 kHz, and supporting coverage enhancements.

Names like Cat 0-M or CAT M are only examples, and may be changed to other names.

From the network perspective, there may be a concern to handle common data to address all three UE types. Accordingly, the following categories of service may be considered.

(1) The network may support individual physical broadcast channel (PBCH)/SIB/paging/physical random access channel (RRACH) procedures for each UE type. In this case, the network may transmit multiple different PBCH/SIB/paging/PRACH for supporting different UE types.

(2) The network may support only Cat 0-M UE and Cat M UE, separately. In this case, Cat 1 UE may need to read PBCH/SIB/paging/PRACH via procedure for Cat 0-M UE or Cat M UE. Support of Cat 0-M PBCH/SIB/paging/PRACH procedure and/or Cat M PBCH/SIB/paging/PRACH procedure may be a UE capability. The similar principle may be applied to Cat 1 procedure as well if defined.

(3) The network may support only Cat M UE. In this case, Cat 1 UE or Cat 0-M UE may need to read PBCH/SIB/paging/RPACH via procedure for Cat M UE. To support this, it may be mandated to support Cat M initial access procedure by other UE categories. Or, it may be a UE capability to support Cat M initial access procedure.

Furthermore, in terms of initial access procedure of Cat M UE, three different operation modes may be considered as follows.

(1) Stand-alone: A dedicated narrowband carrier is allocated to support Cat M UE.

(2) Guard-band: A dedicated narrowband carrier which is placed in the guard band is allocated to support Cat M UE.

(3) In-band: Resource of narrowband carrier for Cat M UE is shared with a legacy system bandwidth.

Furthermore, there may be multiple different radio access technologies (RATs), such as GSM, LTE, or a new RAT in which IoT UEs can be served.

As described above, when there are multiple options, e.g. different UE categories, different operation modes, in the network, the network may support one or a few options. Since Cat 0-M and Cat M procedures, other than initial access procedure, may be quite similar when both supports in-band operation in LTE carrier, it may be proposed to have a UE capability to support Cat M initial access procedure by other UE categories. In other words, other UE categories may also perform Cat M initial access procedure, such as cell search, PRACH and paging. For this, it may be required that the UE reports its capability. When the network supports both Cat 0-M and Cat M initial access procedure, it is up to the UE which procedure it will select. Similar to the relationship between Cat 1 procedure and Cat 0-M procedure when Cat 1 UE utilizes Cat 0-M initial access procedure, if Cat 0-M UE utilizes Cat M initial access procedure, at least for initial access procedure, Cat 0-M UE may behave such as its RF bandwidth is same as Cat M UE. In other words, even though Cat 0-M UE can access larger bandwidth, Cat 0-M UE may access only 200 kHz in terms of initial procedure perspective.

To have the same behavior from the network perspective, Cat 0-M UE may also support other procedures of Cat M UE. In other words, Cat 0-M UE may access the network supporting Cat M UE by behaving that Cat 0-M UE has the Cat M UE capability. For this, Cat 0-M UE and Cat M UE may have the same behavior except that services for Cat M UE is done at 6 ms range rather than 1 ms range for any control/data transmission. Also, only synchronization signals may be different. It may be considered as follows.

In stand-alone operation mode, continuous subframes of grouping of 6 PRBs may be assumed to be one subframe of 6 PRB for Cat 0-M UE. In this case, TTI may be extended to 6 ms from 1 ms (i.e. extended to multiple TTIs)

In in-band operation mode, continuous subframes from only a set of valid subframes indicated by the network may be used for extension. In this case, consecutive 6 subframes may assumed to be one TTI.

The interval between signals such as PBCH repetition may be extended by 6 times. For example, one PBCH is transmitted in every 60 ms rather than 10 ms, as the TTI is extended to 6 ms.

If the network supports TDD operation, continuous subframes from only a set of valid DL subframes indicated by the network may be used for extension. In this case, consecutive 6 DL subframes may be assumed as one TTI. Similar mechanism may be applied to UL as well.

Alternatively, Cat M procedures may be assumed as default. For the initial access, Cat M procedures may be used. After Cat 0-M UE reports its capability, the network may indicate its intention to support more than 200 kHz to Cat 0-M UE. The network may indicate the number of PRBs used in DL and the number of subcarriers used in UL respectively such that the Cat 0-M UE applies shorter TTI (e.g. if M PRBs are allocated to the Cat 0-M UE, the TTI size may become shorter by TTI_CatM/M). Also, the subcarrier spacing on UL may be configurable to the Cat 0-M UE, and it may be a UE capability to support flexible subcarrier spacing in UL or support multiple subcarrier spacing. When different DL subcarrier spacing is used for DL transmission, it may also be UE capability to indicate whether multiple spacing is supported or only one size is supported.

When the network can operate in different operation mode, how the UE differentiate the network operation mode needs to be addressed. Particularly, when the UE supports only one or a subset of operation modes, it may be necessary to differentiate the operation mode as quickly as possible to avoid unnecessary UE battery consumption. Overall, the following mechanism may be considered to support different operation modes.

(1) Type A: A UE supports IoT protocol, and the UE may support all three operation modes. Since it is not known in prior what operation mode the network is going to deploy, the UE may support all three operation modes. Hereinafter, this may be called Type A option, and how to support type A option will be described further in below.

(2) Type B: Different operation mode may be supported by different UEs. To differentiate the operation mode, either synchronization signal may indicate the different operation mode or some design such as subcarrier spacing may be tightly coupled with different operation mode. For example, smaller subcarrier spacing may be used for stand-alone operation mode, while larger subcarrier spacing may be used for in-band operation mode.

How to support Type A option is described in detail. If different behaviors between different operation modes are used, it increases the UE complexity as the UE needs to support different behaviors. Thus, to effectively support Type A option, it may be necessary to have a common design as much as possible. However, different behaviors such as the number of REs available, reference signal (RS) pattern, etc., may be expected. For example, the interval between two consecutive synchronization signals may be different in different operation modes due to its different power.

One approach is to allow different coverage per each operation mode such that the same periodicity of synchronization signals may be used in different operation mode. In other words, if the network uses lower power, it may achieve less coverage in in-band operation mode, compared to the stand-alone operation mode. Another approach is to take the maximum repetition number as default such that in stand-alone operation mode, the network may transmit more than the required. Another approach is to use different repetition factor per operation mode or per maximum power used in synchronization signal. To facilitate the UE blind detection reliability, different scrambling or root sequence may be used to indicate the maximum power or the number of repetition of synchronization signal or the interval between consecutive synchronization signals. Another approach is to depend on UE blind detection which leads the UE to perform more than one candidate of synchronization signal detection. This approach may not be generally suggested, as it may reduce the reliability. One example is to transmit two copies of synchronization signals may be used in one TTI in in-band operation mode, whereas one copy of synchronization signal may be used in one TTI in stand-alone operation mode.

Alternatively, in in-band operation mode, the same interval and UE acquisition time relaxation may be used. Even in this case, a UE may need to know which operation mode it is operating.

For acquiring information on the operation mode, it may be considered as follows.

The operation mode may be differentiated by the frequency to which the UE monitors. For example, if GSM frequency is used, stand-alone operation mode may be assumed. If guard band frequency is monitored, guard-band operation mode may be assumed. If LTE frequency is monitored, in-band operation mode may be assumed. The mapping between operation mode and frequency may be known in prior to the UE, such that by monitoring a frequency, the UE may automatically know which operation mode will be used. If this is used, depending on frequency bands that the UE supports, the UE automatically may indicate whether the UE supports all three operation modes or a set of operation modes. Or, the operation mode may be rather determined based on the region where the UE is operating as well.

If the different operation modes are used in the same frequency, a mechanism to differentiate different operation modes may be signaled via synchronization signal and/or PBCH and/or SIB.

For each operation mode, the same frequency of synchronization signal and/or PBCH transmission may be used. However, different subcarrier spacing may be used even for the same frequency depending on where the stand-alone IoT frequency is located. For example, if the IoT frequency is located in the edge of band, the same subcarrier spacing for in-band operation mode may be used. Thus, regardless of operation mode, it may be still necessary to differentiate the subcarrier spacing via synchronization signal. For that, different root sequences may be used for different subcarrier spacing.

When operation modes need to be differentiated, the following options may be considered. The options described below may be applied to differentiate subcarrier spacing as well. Furthermore, the options described below may be applied to differentiate between FDD and TDD. Depending on the design, it may be desirable to push the differentiation towards PBCH or SIB. However, without differentiation, it may also imply that the same design among different modes/duplex should be used.

(1) Differentiated by Synchronization Signals

Different root sequences or cyclic shifts used in primary synchronization signal (PSS) and/or secondary synchronization signal (SSS): Different value may be used per each operation mode. This approach may be more effective when the frequency/repetition level of PSS and/or SSS is also different per operation mode.

Different subframe gap between PSS and/or SSS or different synchronization signals or synchronization signals and PBCH.

Implicitly by detecting the number of repetitions or positions of PSS and/or SSS.

(2) Differentiated by PBCH

Explicit indication from PBCH: This approach may assume that the same PBCH is used regardless of operation mode.

Implicit by detecting the number of repetitions or positions of PBCH.

Overall, differentiation of each operation mode may be performed individually or jointly. For example, if TDD is not supported in stand-alone operation mode, stand-alone FDD operation mode, in-band FDD operation mode, in-band TDD operation mode, guard-band FDD operation mode, and guard-band TDD operation mode may need to be differentiated.

Since it is expected that different frequencies/repetition levels/payloads of PBCH are used in in-band operation mode and stand-alone operation mode, it may be desirable to differentiate at least in-band operation mode and stand-alone operation mode. However, rate matching pattern between in-band operation mode and guard-band operation mode may be different. Thus, differentiation between guard-band operation mode and in-band operation mode seems also necessary, which may not be easily differentiable when the same frequency/repetition level of synchronizations is used. For this, different gaps between synchronization signals may be used to differentiate in-band operation mode and guard-band operation mode, and different repetition levels may be used to differentiate stand-alone operation mode and in-band/guard-band operation mode.

In terms of repetition levels of synchronization signals, and/or PBCH per each operation mode, overall, it may be considered to explicitly signal the repetition level via synchronization signals, e.g. SSS. At least, PBCH should be able to signal the repetition level used for other successive messages such as SIB. Repetition level of synchronization signal and PBCH may be implicitly associated. For example, if different pseudo-noise (PN) sequence lengths are used depending on the number of SSS per M subframes (e.g. M=80), to differentiate K number of SSS within M ms, K length of PN sequence (or similar sequence) may be used, and different lengths of sequence may be used depending on K. By detecting K, a UE may know the repetition level of SSS, which then may be mapped to PBCH repetition level. Generally, the same number of repetition or level same overhead between SSS and PBCH may be assumed, or the mapping may be implicitly derived from a specific function.

Alternatively, small PBCH or a new channel with small cyclic redundancy check (CRC) may be designed and then may be transmitted with less repetitions. The information carried in PBCH may include at least one of the followings.
  FDD/TDD indication
  Any necessary information to read SIB (e.g. repetition level, subframes, transport block size (TBS), etc.)
  Vshift value of cell-specific reference signal (CRS)
  System frame number (SFN)

Since the legacy and IoT carriers may be collocated or the network may maintain the same cell ID between legacy and IoT carriers in in-band operation mode, by detecting a cell ID, the UE may obtain the cell ID of the legacy carrier as well. In this case, legacy CRS may be utilized even for PBCH data demodulation.

The small PBCH or new channel with small CRC may be designed similar to PSS/SSS, and information may be carried in a combination of e.g. root sequence, cyclic shift and the OFDM symbol index. For example, different sequence may be mapped to each OFDM symbol, and the shift value of sequence mapped to each OFDM symbol may be used as information. For example, if L shift values are available, and P OFDM symbols are available, L*P combinations may be available. For example, if the same L shift values are be used in different OFDM symbols, L^P combinations may be available.

Hereinafter, per each operation mode, how to have a common design between different operation modes and what might be different components are describe in detail.

(1) Synchronization signals: The same sequence and same detection mechanism may be used. Only difference may be the interval between two consecutive sequences. Or, the number of repetitions within a duration T may be different. If the UE knows stand-alone operation mode, the UE may assume that single CP length is used for synchronization signals, such that it can reduce its blind detection complexity. For in-band operation mode, both normal and extended CP may be used. Thus, in a frequency where the UE knows in-band operation mode may be used may perform blind detection on both CP lengths. For stand-alone operation mode, single CP length may be used. For guard-band operation mode, the UE may follow either stand-alone operation mode or in-band operation mode. When a UE searches an IoT carrier in a guard-band, it may not be able to know which operation mode is used. Alternatively, if the guard-band is located near GSM band, stand-alone operation mode may be assumed, and if the guard-band is located near LTE band, in-band operation mode may assumed. Or, the operation mode per each guard-band may be prefixed or known in prior. To avoid unnecessary UE blind decoding, per frequency, it may also be informed that whether there is extended CP or not. Unless such list is provided, a UE may assume that only one CP is supported in a frequency and the supported CP type may be different per frequency. This may be predefined.

Since TDD may be also used in in-band operation mode, in terms of length where one synchronization signal is transmitted is less than 1 ms, considering legacy PDCCH region, the duration may be smaller than 1 ms in total. Further, considering in-band operation with TDD, the interval between two consecutive synchronization signals may be multiple of 10 ms (e.g. 20, 40, 60, 80 ms). Considering multicast-broadcast single-frequency network (MBSFN) configuration and other absolute blank subframe (ABS) configuration, to use 40 or 80 ms may be preferred. In this case, a copy of synchronization signal may be transmitted in the next subframe. In other words, the sequence transmission may be PSS1/PSS2 (over 2 ms subframes) and may be repeated in every 40 or 80 ms. When it is transmitted, it may be mapped in a mirroring fashion such that by searching two identical sequence, it may search the CP length. For example, if 9 OFDM symbols are used for PSS and 8 subcarriers are used for PSS in each OFDM symbol, then totally 72 subcarriers may be used. Assuming Zadoff-Chu (ZC) sequence of 71, it may be mapped to 9 OFDM symbols in subframe i as "[0-7][8-15] . . . [64-71]" and in subframe i+1 as "[64-71] . . . [8-15][0-7]". By correlating [64-71] with two different CP length, it may detect the CP length. For carrier frequency offset (CFO) tracking, differential ZC sequence may also be used for PSS1 and PSS2.

(2) Frame Structure

Assuming about 1000 bits are transmitted to an IoT UE, at least around 10 ms may be needed for transmission. Furthermore, to cover the worst case coverage, at least multiple repetitions may be necessary. Thus, one TTI used for IoT UE may be at least larger than 5 ms interval. Thus, it may be proposed to take 10 ms as a subframe unit in IoT frame structure.

FIG. 8 shows an example of IoT frame structure according to an embodiment of the present invention. Referring to FIG. 8, one IoT subframe may occupy 10 ms. Accordingly, one IoT frame may occupy 80 ms, and one IoT super frame may occupy 640 ms.

When the IoT frame structure shown above is used, subframe index may not be used per 1 ms. Accordingly, PRB concept may be applied within one subframe.

FIG. 9 shows an example of subframe index according to an embodiment of the present invention. Referring to FIG. 9, resource block within one subframe may be accessed by PRB index (or resource index, in general). The demodulation reference signal (DM-RS) and/or CRS sequence may be generated based on the resource index within a subframe. In other words, a set of 1 ms LTE subframes may be used as a set of resource blocks with the same subframe index. To access or schedule control signal and/or data within one subframe, resource index may be used from the scheduling and/or configuration perspective. Particularly, for sequence generation of reference signal, the resource index may be used. The first resource index may be as PRB index 0 (or other number, which is configurable by higher layer).

FIG. 10 shows an example of synchronization signal and PBCH/SIB transmission according to an embodiment of the present invention. Referring to FIG. 10, one IoT subframe occupies 10 ms, one IoT frame occupies 80 ms, and one IoT super frame occupies 640 ms. Synchronization signal is transmitted in less than 1 ms to work in in-band operation mode. PBCH is transmitted in every 10 ms and the partial transmission of one PBCH is transmitted in every 10 ms. It is spread over 80 ms window (one PBCH transmission) and it may be transmitted over 8 radio frames. In every 640 ms, the new PBCH may be transmitted with different SFN value in PBCH. In other words, the same PBCH (in terms of content) may be transmitted in one super frame.

FIG. 11 shows another example of synchronization signal and PBCH/SIB transmission according to an embodiment of the present invention. The number of available subframe in in-band operation may be smaller, and thus, multiple of basic IoT frame structure may also be considered. For example, one IoT subframe may take 40 ms rather than 10 ms. Referring to FIG. 11, one IoT subframe occupies 40 ms, one IoT frame occupies 320 ms, and one IoT super frame occupies 250 ms. That is, the size of one super frame becomes more than 2.4 seconds. The remaining structure for transmission of synchronization signal and PBCH/SIB is the same as FIG. 10. Alternatively, two times of extension of IoT frame structure shown in FIG. 10 may be used in stand-alone operation mode, while four times of extension of IoT frame structure shown in FIG. 10 may be used in in-band operation mode.

FIG. 12 shows another example of synchronization signal and PBCH/SIB transmission according to an embodiment of the present invention. Referring to FIG. 12, one IoT subframe occupies 20 ms, one IoT frame occupies 160 ms, and one IoT super frame occupies 1280 ms. In in-band operation mode, more repetition of PSS/SSS and/or PBCH may be considered.

In other words, different frame sizes and/or different repetition numbers of synchronization signals may be used which are known to the UE by identifying in-band operation mode or stand-alone operation mode.

(3) SSS

The same SSS may be used for all operation modes, and SSS may contain information on subcarrier spacing used for other channels other than synchronization signals. Accordingly, a UE may appropriately adjust its subcarrier spacing. Once it detects the subcarrier spacing, the UE may switch the subcarrier spacing before performing any initial association procedure. However, if the UE does not support the subcarrier spacing that the SSS indicates, the UE may bar the cell automatically and continue cell search on different frequency. Depending on UE implementation and/or configured priority, it is generally preferred to associate with stand-alone carrier, since the stand-alone carrier may offer better coverage and spectral efficiency. For cell selection criteria, cell detection time may be used as a cell selection criteria instead of measuring signal-to-interference and noise ratio (SINR) of synchronization signal. If the cell is detected within a threshold, the UE may know that the cell can be accessible and then attempt to be associated with the cell. To minimize the UE battery consumption, the UE may attempt to associate with a cell at the first match regardless of whether there could be another better cell.

Further, the UE may perform cell reselection if the UE needs further enhancement depending on its application type and other demands. In other words, the network may not require the UE to perform cell reselection, though the network may offer information of neighbor cells in terms of operation mode, transmission power, supported coverage level, load situation, etc. At least one piece of information described above may be broadcast by each cell or by the serving cell. When the cell becomes congested, and thus, does not want to accept new UEs, the cell may use different synchronization sequences. Thus, a UE associated with a cell or camped on a cell may research the synchronization signals based on either the initial sequence or the new sequence with potential overload indication. This is to save the UE power consumption on unsuccessful cell detection. When the cell wants to detach UEs due to congestion/overload, barring mechanism via SIB may be reused. The synchronization sequence mechanism may be used only for new UEs attempting to camp on or be associated with.

(4) PBCH Mapping

When different subcarrier spacing is used, PBCH RE mapping may change in time domain to frequency domain. For example, if subcarrier spacing of 3.75 kHz and 15 kHz is used, the length of OFDM symbol with 3.75 kHz may be four times longer than that of OFDM symbol with 15 kHz. Also, the number of subcarriers usable by PBCH may be increased up to 4 times. If PBCH is mapped to e.g. 4 OFDM symbols in a subframe with 15 kHz, the PBCH may be mapped to one OFDM symbol with more subcarriers with 3.75 kHz. For this, different mappings between different subcarrier spacing may be used. For example, overall, resource mapping may change if 15 kHz is default. Within the same resource block, frequency first and time second resource mapping may be reused. In terms of TTI, LTE subframe may be used or IoT subframe may be used. If this used, the TTI size of 3.75 kHz may become four times longer. More generally, subcarrier index i, OFDM symbol l in J-th TTI may be mapped to subcarrier index i+mod (J, 4)*12 and OFDM symbol l in floor (J/4) TTI with 3.75 kHz. Further, data mapping may be based on 15 kHz if both in-band and standalone operations are supported.

(5) EPDCCH mapping: Similar to PBCH, all resource mapping for all channels may be changed with different TTI sizes. Timing relationship and timer with 3.75 kHz may become 25% (in terms of TTI) compared to 15 kHz.

Hereinafter, mapping of synchronization signals and PBCH in in-band operation considering legacy impacts according to an embodiment of the present invention is described. When TDD/FDD indication is done in PBCH, the mapping of synchronization signals and PBCH in in-band operation in consideration of legacy impacts are rather limited. Thus, the following options may be considered.

(1) If all TDD configurations are supported and the same mapping between FDD/TDD is used, and if MBSFN-capable subframes can be used in FDD, only subframe #0, #1, #5 and #6 may be available for any transmission. For subframe #1 and #6, the minimum DwPTS size may not be supported in in-band operation mode. If those are not supported, minimum DwPTS size may be 6 OFDM symbols in extended CP or 9 OFDM symbols in normal CP. Only that number of OFDM symbols may be available for any signal transmission in subframe #1 and #6. If MBSFN-capable subframes cannot be used in FDD, only subframe #0 and #5 may be available.

(2) If only a few TDD configurations are supported and the same mapping between TDD/FDD is used, and if MBSFN-capable subframes can be used in FDD, only subframe #0, #1, #4, #5, #6 and #9 may be available for any transmission. For subframe #1 and #6, the minimum DwPTS size may not be supported in in-band operation mode. If those are not supported, minimum DwPTS size may be 6 OFDM symbols in extended CP or 9 OFDM symbols in normal CP. Only that number of OFDM symbols may be available for any signal transmission in subframe #1 and #6. If MBSFN-capable subframes cannot be used in FDD, subframe #0, #4, #5 and #9 may be available, where subframe #4 may be UL subframe in some TDD configurations. Generally, it may be preferred to use subframe #0, #5, and #9, since it may support large number of TDD configurations.

(3) If only one TDD configuration (e.g. TDD configuration #2) is supported, more subframes (common between TDD and FDD without considering MBSFN-capable subframes) may be considered. However, MBSFN capable subframes for TDD may need to be excluded as well if needed.

(4) Alternatively, different narrowband may be used for PBCH transmission from synchronization signals. The physical location may be fixed. For example, PBCH may be transmitted at +180 kHz (or other fixed number) from synchronization signal to increase the number of opportunities to transmit PBCH/SIB, etc.

(5) At least for SIB transmission, different narrowband may be considered in in-band operation mode. In other words, the location of SIB may change in in-band operation mode and stand-alone operation mode. Further, frequency may also be different from each other. The same location where PBCH is transmitted in terms of time may be used to transmit SIB as well.

(6) In general, it is desirable to have consecutive transmission of one transmission. Assuming three or four subframes are available in one radio frame, thus, one channel (e.g. PSS or SSS or PBCH) may occupy consecutive subframes. For example, at most, it is likely that two consecutive subframes may be available considering MBSFN-capable subframes. Then, in one radio frame, one may be used for that consecutive subframes, and may be repeated e.g. in two radio frames. For example, in SFN 0, 1, 2, 3 with four available subframes SF1, SF2, SF3, and SF4, the transmission position assuming SF1 and SF4 are consecutive may be as follows.

PSS: SF4 in SFN0, SF0 in SFN1, SF4 in SFN2, SF0 in SFN3

SSS: SF4 in SFN1, SF0 in SFN2, SF4 in SFN3, SF0 in SFN4

PBCH: SF2/SF3 in SFN 0, 2 (or SF2 in every radio frame)

This principle is to increase the periodicity to increase the consecutive number of subframes usable per period/transmission opportunity.

PBCH design according to an embodiment of the present invention is described. Assuming that the UE may not know which operation mode is used in a given frequency in which the UE is trying to identify and attach to the cell, the UE may need to blindly search its operation mode. Depending on the operation mode, the mapping of PBCH may be different or the operation mode may be indicated by PBCH. When operation mode is indicated by PBCH, common resource mapping for PBCH may be necessary, where the resource mapping for in-band operation mode may be default. When a common PBCH is used, the size may be the same regardless of operation mode. The information necessary per each operation mode may be as follows:

(1) Operation mode: It may be one of stand-alone operation mode, in-band operation mode, and optionally, guard-band operation mode. Based on operation mode, data rate matching may be determined.

(2) Common parameters: It may include at least one of the followings:
SIB1 TBS and/or transmission location and/or density
Paging indicator or DCI indicator to assist UE power consumption reduction
SFN
Repetition level/coverage level or repetition pattern.

(3) In in-band operation mode (or guard-band operation mode)
FDD or TDD: This may be included in the reserved bits when TDD is introduced rather than fixed. In other words, this field does not need to be the common field among all operation modes.
SIB1 narrowband/PRB location: If multiple IoT carriers are supported, index where SIB1 is transmitted (in case frequency hopping is used, multiple IoT carriers) may be considered. To have a common design, the location of SIB1 may be fixed in in-band operation mode, and SIB1 may signal some other IoT carrier/PRB for other channel transmissions.
Valid subframe configuration or usable subframe configuration: If this is not given, a UE may assumed that at least for PBCH/SIB1, only non-MBSFN subframe is available for PBCH/SIB1 transmission. In guard-band/stand-alone operation mode, all DL subframes may be available unless explicit configuration is configured otherwise. In in-band operation mode, non-MBSFN subframes may be valid unless explicit configuration, such as MBSFN configuration or set of valid subframe, is configured otherwise.

PBCH transmission interval and pattern according to an embodiment of the present invention is described. The number of REs which can be transmitted in subframe #0 may be 12*5=60 REs, and when 8 repetitions are performed, the number of REs which is transmitted in one 80 ms interval is 480 REs. Considering quadrature phase shift keying (QPSK) modulation, 960 bits may be transmitted, and the number of PBCH encoded bits which can be transmitted in one interval may be 960*8=7680 bits. Therefore, the number of PBCH encoded bits in 640 ms interval is 7680*8=61440 bits. Considering payload size of the current PBCH, this corresponds to 32 repetitions. In this case, at least one of the following options may be considered.

(1) PBCH of 640 ms interval may be configured by 16 PBCH block of 40 ms. In this case, the SSS may provide information on 4 subframe location, and the UE may perform blind decoding according to scrambling code. Since one PBCH block of 40 ms may be restricted to 480 bits, single PBCH block may not be blindly decoded well.

(2) PBCH may be transmitted over more than one subframe in each 40 ms window. For example, PBCH may be transmitted in every 160 ms and at least two consecutive or non-consecutive subframes may be used for PBCH transmission. If SSS is transmitted in every 20 ms, 8 hypothesis of location of SSS transmission may be necessary.

(3) PBCH of 640 ms interval may be configured by 4 PBCH block of 160 ms. In this case, the SSS may provide information on 16 subframe location, and the UE may perform blind decoding according to scrambling code. Since one PBCH block of 160 ms may be restricted to 1920 bits, single PBCH block may be blindly decoded well.

(4) SSS may indicate 4 different locations within 80 ms. SSS may be transmitted more than one subframe in each radio frame. The interval or SFN where SSS is transmitted may be every 2 radio frames. Among 80 ms, SSS may indicate in which radio frame SSS has been transmitted.

PBCH may identified based on the information. The possible location of SSS may be subframe #4 and #5 in FDD (also for TDD as well) in even radio frame. In this case, PBCH may be transmitted in subframe #4 and #5 in FDD (also for TDD as well) in odd radio frame. In this case, if one PBCH is transmitted over 640 ms, 8 blind decoding of PBCH may be necessary.

(5) SSS may indicate 8 different locations within 160 ms. In this case, blind decoding of PBCH may be reduced to 4 assuming 640 ms interval.

For example, PSS may be transmitted in subframe #0 in every radio frame, SSS may be transmitted in subframe #4 and #5 in every even radio frame, and PBCH may be transmitted in subframe #4 and #5 in every odd radio frame. For another example, PSS may be transmitted in subframe #0 in every radio frame, SSS may be transmitted in subframe #4, #5 and #9 in every even radio frame, and PBCH may be transmitted in subframe #4, #5 and #9 in every odd radio frame. However, this may require SSS location blind detection.

Alternatively, PSS may be transmitted in two or more subframes in every 20 m. This may determine the location of SSS in every 20 ms. PSS may be transmitted e.g. 4 subframes in every 40 ms (or m subframes in every N ms depending on the required number of repetition), and the next radio frame may be used for SSS transmission. By doing this, the number of hypothesis needed by SSS in terms of possible location may be reduced.

For example, PSS may be transmitted in subframe #0, #4, #5 and #9 in SFN % 4=0, SSS may be transmitted in subframe #0, #4, #5 and #9 in SFN % 4=1, PBCH may be transmitted in subframe #0, #4, #5 and #9 in SFN % 4=2 and SIB1 may be transmitted in subframe #0, #4, #5 and #9 in SFN % 4=3 (Instead of 4 subframes per 40 ms, less number of subframe may also be used). In TDD, assuming a certain special subframe (e.g. DwPTS length=10 OFDM symbol), subframe #0, #1, #5 and #6 may be assumed. Depending on the mapping, differentiation between FDD and TDD may be realized.

Legacy CRS handling according to an embodiment of the present invention is described. When legacy CRS is transmitted in in-band operation mode, it may need to be determined whether to use legacy CRS for PBCH decoding. If legacy CRS is not used for PBCH decoding, further clarification may be needed for which channel(s) assumes use of legacy CRS. The use of legacy CRS may require at least one of the following information.

Vshift or cell ID: The same cell ID detected by NB-IoT synchronization signals may be used for CRS scrambling.

PRB or subcarrier index where CRS has been transmitted. This is necessary to decode legacy CRS. This information may be known by pre-allocated/defined rule, or by PBCH or SIB or higher layer signaling.

Subframe index or slot index: The slot index/subframe index may be identified by detecting NB-IoT synchronization signals.

Configuration of MBSFN subframes: This configuration may also be necessary to indicate a set of subframes where CRS may not be transmitted.

To utilize legacy CRS for PBCH decoding, at least one of the following options may be considered. It may be assumed that 4 ports CRS transmission is used from data rate matching perspective. In other words, all CRS REs assuming 4 ports may not be used for PBCH data mapping.

(1) Option 1: Similar to legacy PBCH detection, blind detection on CRS port may be used. In this case, if additional RS is used, additional RS may be quasi-collocated with CRS port 0 (and CRS port 1) depending on the legacy configuration. In other words, the antenna port(s) of additional RS may be same as the legacy CRS antenna ports. However, only single or two ports additional RS may be supported.

(2) Option 2: Single port transmission may always be used regardless of actual CRS transmission. This is to minimize the difference between different operation modes and minimize UE complexity. In this case, additional RS may always be single port transmission.

(3) Option 3: Two port transmission may always be used. In case of single port network, the copy of single port to the second port may be assumed. If this is used, antenna diversity technique such as space frequency block coding (SFBC), antenna selection may not be enabled even with two ports.

If legacy CRS is used, to have a commonality, it may need to also support that legacy CRS is transmitted in stand-alone and/or guard-band operation modes. The same scrambling may be used regardless of operation modes to minimize UE complexity increase. For example, if a prefixed PRB or subcarrier index (e.g. subcarrier index of 36-47 from the center is used for legacy CRS in IoT carrier), the same subcarrier index/subframe index may be used for stand-alone/guard-band operation modes. From a UE channel estimation perspective, a UE may not be able to assume that legacy CRS will be present in other subframe(s) than subframes carrying PBCH. In other words, multi-subframe channel estimation over CRS assuming continuous CRS transmission may not be achievable for PBCH decoding. With this restriction, the network may be able to transmit legacy CRS only in PBCH subframes regardless of operation modes. Once the operation mode is identified by the UE, RS assumption afterwards may be different from each other depending on operation modes. In in-band operation mode, the same RS pattern may be used. For stand-alone/guard-band operation modes, only dedicated RS pattern may be used. When dedicated RS pattern is used in stand-alone/guard-band operation modes, it may be a superset of legacy CRS pattern. In other words, legacy CRS pattern+additional RS pattern in in-band operation mode may correspond to the dedicated RS pattern in stand-alone/guard-band operation modes.

By utilizing legacy CRS, more REs may be available for PBCH transmission. At least, 11 OFDM symbols may be available for PBCH transmission. This will minimize the necessary PBCH repetitions in terms of number of subframes. Otherwise, PBCH may not be mapped to legacy CRS symbol which cause inefficient resource utilization. Further, if legacy CRS is not used for PBCH decoding, it needs to be determined from which channel CRS can be used. For example, where CRS related information is carried in PBCH may start from SIB1. However, this approach leads overhead in PBCH. Another approach is to convey legacy CRS related information in SIB1.

Alternatively, the dedicated RS pattern may always be used, which consists of legacy CRS pattern+additional RS pattern. Regardless of presence of legacy CRS or not, the UE may use the dedicated RS pattern (or NB-IoT CRS pattern) for data demodulation including PBCH. In this case, only single or two ports may be used (i.e. not support of 4 ports legacy CRS transmission). In in-band operation mode, different power may be used in legacy CRS and additional RS pattern. The same power may be used for legacy CRS and additional RS or a UE may perform channel estimation assuming both cases (i.e. blindly search).

To support this, additional RS pattern may also change based on cell ID, which should be very similar pattern to legacy CRS. In terms of scrambling, a prefixed scrambling may be used. In other words, additional RS may also be scrambled based on the same subcarrier/PRB index to the legacy CRS (i.e. the same rule to determine PRB/subcarrier index of legacy CRS is used for NB-IoT CRS pattern or dedicated RS pattern). The subframe index may follow the subframe index of NB-IoT carrier. It is up to the network to make it sure that two systems are aligned.

However, if additional IoT carrier is configured for potentially control/data channel monitoring including SIB transmission, the PRB or subcarrier index and/or subframe index of legacy cell may be indicated to the UE if legacy CRS is used by a IoT UE.

This may also apply to the case where a UE is configured with an in-band IoT carrier while it has been associated with a IoT carrier operating in guard-band. Operation mode or data rate matching pattern of an IoT carrier needs to be indicated as well in such case.

Further, Rel-13 enhanced MTC (eMTC) low cost UEs (which supports up to 1.4 MHz system bandwidth) may be able to be associated with an IoT carrier if it has a capability to support IoT functionality. For example, the UE may have experienced very low SINR (and thus requires very high coverage enhancement level). In this case, if the UE is not capable of searching eMTC carrier supporting sufficient coverage enhancement level, it may attempt to be associated with IoT carrier if it has the capability. In this case, the UE may behave as if an IoT UE from the network perspective. It may be also considerable to allow carrier-aggregation like behaviors to such UEs. Without additional configuration, the UE may connect to the network following the same procedure that IoT UE (i.e. supporting only 200 kHz system bandwidth) is going to use.

FIG. 13 shows a method for transmitting information according to an embodiment of the present invention. The embodiments of the present invention described above may be applied to this embodiment.

In step S100, the BS determines DL subframes according to a number of supported TDD configurations. If all TDD configurations are supported, and if MBSFN capable subframes are used, the DL subframes may correspond to subframes #0, #1, #5 and #6. If all TDD configurations are supported, and if MBSFN capable subframes are not used, the DL subframes may correspond to subframes #0 and #5. Alternatively, if only partial TDD configurations are supported, and if MBSFN capable subframes are used, the DL subframes may correspond to subframes #0, #1, #4, #5, #6 and #9. If only partial TDD configurations are supported, and if MBSFN capable subframes are not used, the DL subframes may correspond to subframes #0, #4, #5 and #9.

In step S110, the BS transmits at least one of synchronization signals or a PBCH to an IoT UE via the DL subframes. A first narrowband for transmission of the synchronization signals and a second narrowband for transmission of the PBCH may be different from each other. Locations of the first narrowband and the second narrowband may be fixed. Transmission of the synchronization signals or the PBCH may occupy consecutive subframe.

FIG. 14 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

An IoT UE UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method performed by a base station (BS) in a wireless communication system, the method comprising:
transmitting at least one of synchronization signals or a physical broadcast channel (PBCH) to at least one user equipment (UE) via one or more subframes among a first set of subframes in case that a first number of time division duplex (TDD) configurations are supported; and
transmitting the at least one of the synchronization signals or the PBCH to the at least one UE via one or more subframes among a second set of subframes in case that a second number of TDD configurations are supported,
wherein the first set of subframes comprises a first part of the subframes in a frame available for a transmission, and
wherein the second set of subframes comprises a second part of the subframes in the frame available for the transmission.

2. The method of claim 1, wherein the first number of TDD configurations comprise all TDD configurations.

3. The method of claim 2, wherein the first set of subframes includes subframes #0, #1, #5 and #6 based on a determination that multicast-broadcast single-frequency network (MBSFN) capable subframes are used.

4. The method of claim 2, wherein the first set of subframes includes subframes #0 and #5 based on a determination that multicast-broadcast single-frequency network (MBSFN) capable subframes are unused.

5. The method of claim 1, wherein the second number of TDD configurations comprise a part of all TDD configurations.

6. The method of claim 5, wherein the second set of subframes includes subframes #0, #1, #4, #5, #6 and #9 based on a determination that multicast-broadcast single-frequency network (MBSFN) capable subframes are used.

7. The method of claim 5 wherein the second set of subframes includes subframes #0, #4, #5 and #9 based on a determination that multicast-broadcast single-frequency network (MBSFN) capable subframes are unused.

8. The method of claim 1, wherein the transmitting of the at least one of the synchronization signals or the PBCH comprises transmitting the synchronization signals and the PBCH, and
wherein a first narrowband for transmitting the synchronization signals is different from a second narrowband for transmitting the PBCH.

9. The method of claim 8, wherein locations of the first narrowband and the second narrowband are fixed.

10. The method of claim 1, wherein a transmission of the synchronization signals or the PBCH occupies consecutive subframes.

11. The method of claim 1, further comprising:
determining a set of subframes for transmitting the synchronization signals or the PBCH based on at least one of how many TDD configurations are supported and whether multicast-broadcast single-frequency network (MBSFN) capable subframes are used.

12. The method of claim 11, wherein a number of the set of subframes increases as a number N of the supported TDD configurations decreases.

13. The method of claim 1, wherein the at least one of the synchronization signals or the PBCH is transmitted in a narrowband for at least one internet of things (IoT) UE.

14. The method of claim 1, wherein the at least one of the synchronization signals or the PBCH is repeatedly transmitted for coverage enhancement.

15. A base station (BS) in a wireless communication system, the BS comprising:
a transceiver; and
at least one processor coupled to the transceiver and configured to:
control the transceiver to transmit at least one of synchronization signals or a physical broadcast channel (PBCH) to at least one user equipment (UE) via one or more subframes among a first set of subframes in case that a first set of time division duplex (TDD) configurations are supported, and
control the transceiver to transmit the at least one of the synchronization signals or the PBCH to the at least one UE via one or more subframes among a second set of subframes in case that a second number of TDD configurations are supported,
wherein the first set of subframes comprises a first part of the subframes in a frame available for a transmission, and
wherein the second set of subframes comprises a second part of the subframes in the frame available for the transmission.

16. The BS of claim 15, wherein the first number of TDD configurations comprise all TDD configurations.

17. The BS of claim 15, wherein the second number of TDD configurations comprise a part of all TDD configurations.

18. The BS of claim 15, wherein the at least one processor is further configured to determine a set of subframes for transmitting the synchronization signals or the PBCH based on at least one of how many TDD configurations are supported and whether multicast-broadcast single-frequency network (MBSFN) capable subframes are used.

19. The BS of claim 18, wherein a number of the set of subframes increases as a number N of the supported TDD configurations decreases.

* * * * *